United States Patent [19]

Hunter et al.

[11] 3,998,553
[45] Dec. 21, 1976

[54] DEVICE AND METHOD FOR TESTING HIGH REFLECTIVITY AUTOSTIGMATIC OPTICAL ELEMENTS AND SYSTEMS

[75] Inventors: George C. Hunter, Middletown; Paul F. Forman, Weston, both of Conn.

[73] Assignee: Zygo Corporation, Middlefield, Conn.

[22] Filed: May 12, 1975

[21] Appl. No.: 576,963

[52] U.S. Cl. .............................. 356/109; 356/106 R
[51] Int. Cl.² .......................................... G01B 9/02
[58] Field of Search ....................... 356/106 R, 109

[56] References Cited

UNITED STATES PATENTS 3,028,782  4/1962  Bernhardt et al. ................. 356/109
3,506,361  4/1970  Erickson ......................... 356/106 R

OTHER PUBLICATIONS

Heintze et al; "A Multiple Beam Interferometer for use with Spherical Wavefronts"; Applied Optics; vol. 6, No. 11, Nov. 1967 p. 1924.
Houston; Optical Engineering; vol. 13, No. 2, p. G55; Mar.–Apr. 1974.

Primary Examiner—John K. Corbin
Assistant Examiner—Conrad Clark
Attorney, Agent, or Firm—Milton Zucker

[57] ABSTRACT

An optical device and method for testing high reflectivity autostigmatic optical elements and systems is disclosed. A thin, partially transmissive optical element, e.g., a pellicle with an optical coating having a transmission factor determined by the nominal reflectivity of the test article, is placed in the measurement leg of a spherical wavefront Fizeau interferometer so that high contrast, two-beam interference fringes can be obtained from a high reflectivity autostigmatic optical element or system.

7 Claims, 2 Drawing Figures

DEVICE AND METHOD FOR TESTING HIGH REFLECTIVITY AUTOSTIGMATIC OPTICAL ELEMENTS AND SYSTEMS

BACKGROUND OF THE INVENTION

1. Field of the Invention

The present invention relates to a method and device useful for the measurement of high reflectivity autostigmatic optical elements and systems. More particularly, the invention relates to the use of a thin, partially transmissive optical element which is placed in the measurement leg of a spherical wavefront Fizeau interferometer to produce high contrast two-beam interference fringes.

2. The Prior Art

The development of the laser and advances in vacuum coating technology have greatly expanded the utility of classical interferometers. The Fizeau interferometer, in particular, has become an extremely convenient and flexible instrument for a wide variety of optical metrology applications. Nevertheless, a conspicuous shortcoming of the laser Fizeau interferometer has been in the testing of high reflectivity autostigmatic elements and systems. A multiple beam spherical wavefront interferometer is discussed in detail in an article by Heintze et al in Applied Optics, Vol. 6, p. 1924, November 1967. The authors propose a Fizeau multiple beam spherical wavefront interferometer with a field lens at the center of curvature of the reference surface. The major difficulties with the interferometer discussed by Heintze et al are: (1) the partially transmissive coating on the spherical reference surface must be selected to match closely the reflectivity of the test article to achieve useful contrast. Therefore, a number of these expensive elements is required to handle a range of test article reflectivities, and (2) a field lens which matches each test article radius is required.

Other types of interferometry have been used to test high reflectivity autostigmatic optical elements and systems. For example, scatter plate interferometers and shearing type interferometers are two prominent means. However, these interferometers are not only difficult to use and align, but they are also considerably less versatile than the Fizeua interferometer.

While these prior-art techniques are useful for some applications, they cannot be used in many optical metrology applications because of the specific, close match of the elements required to carry out the measurement to the parameters of the test article. To this end, a method and device are required for testing high reflectivity autostigmatic optical elements and systems which do not require the specific, close match of expensive elements to the parameters of the test article.

OBJECTS OF THE INVENTION

It is the principal object of this invention to provide an improved method and device for measuring high reflectivity autostigmatic optical elements and systems.

STATEMENT OF THE INVENTION

In accordance with the instant invention, we test high reflectivity autostigmatic optical elements and systems by modifying a standard Fizeau spherical wavefront interferometer consisting of (1) a source of light (2) means for passing said light, as an expanded beam, through (3) a partially transmissive, partially reflective spherical reference surface to produce a reflected reference wavefront and a transmitted converging spherical wavefront, which is directed at (4) a common center of curvature of the reference surface and the autostigmatic test article (5) probes the test article and is reflected from the test article back through the reference surface and (6) means for interfering the reflected reference wavefront and reflected test wavefront; the modification consists in placing a partially transmissive, coated pellicle between the reference surface and the test article which has a transmission factor T which approximates $$T = \left[ \frac{R_{rs}}{R_{ta}(1 - R_{rs})^2} \right]^{1/2}$$

where $R_{rs}$ is the reflectivity of the reference surface, and $R_{ta}$ is the reflectivity of the test article. Because of the nature of the relationship, only one or two coated pellicles are needed to cover the entire range of test article reflectivities from 8% to 100%, where the reference surface is ordinary uncoated glass with a reflectivity of about 4% or uncoated fused silica with a reflectivity of about 3.5%.

THE DRAWINGS

DETAILED DESCRIPTION OF THE INVENTION

Figure 1:
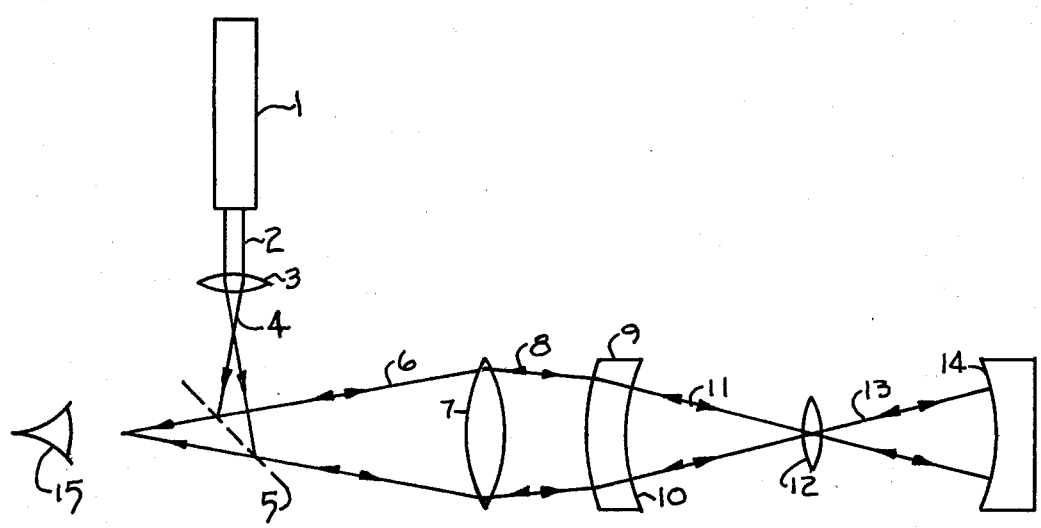
FIG. 1 is a schematic of a Fizeau multiple beam spherical wavefront interferometer — i.e., prior art.

Description and Explanation of the Schematic in FIG. 1 (prior art).

FIG. 1 shows the layout of a typical Fizeau multiple beam spherical wavefront interferometer. A light source such as a tungsten bulb, xenon bulb, light-emitting diode, laser diode, or other source of radiant energy, and most preferably a gas laser 1 provides optical energy. The output laser beam 2 is focused by lens 3 to produce the converging spherical wavefront 4. After passing through focus, wavefront 4 is reflected by beamsplitter 5. The diverging spherical wavefront 6 is converted to a converging spherical wavefront 8 by lens 7. Lenses 3 and 7 serve to expand the diameter of the beam 2. Element 9 is an aplanatic element located in wavefront 8. Element 9 has a non-refracting, spherical reference surface 10. Surface 10 is partially reflective and partially transmissive. The wavefront produced by the reflection of wavefront 8 from surface 10 is the reference wavefront. The wavefront transmitted by surface 10, beam 11, is the converging spherical test wavefront. Surface 14 is the high reflectivity surface under test. Lens 12 is a field lens which images surface 10 onto surface 14. The reflectivity of surface 10 must be chosen to be nearly equal, i.e., to within 5 – 10% to that of surface 14 in order to obtain multiple beam interference fringes having useful contrast. Since for many applications the reflectivity of surface 14 can vary from 4% to 95%, a rather larger number of aplanatic elements is required with various reflectivities to match the range of test article reflectivities. Furthermore, the field lens 12 must be matched to the radius of curvature of the test article in order for it to perform its function which is to eliminate fringe walk-off in the multiple beam fringes.

The interference of the reference wavefront and the measurement wavefronts is viewed at 15.

DESCRIPTION AND EXPLANATION OF THE SCHEMATIC IN FIG. 2.

Figure 2:
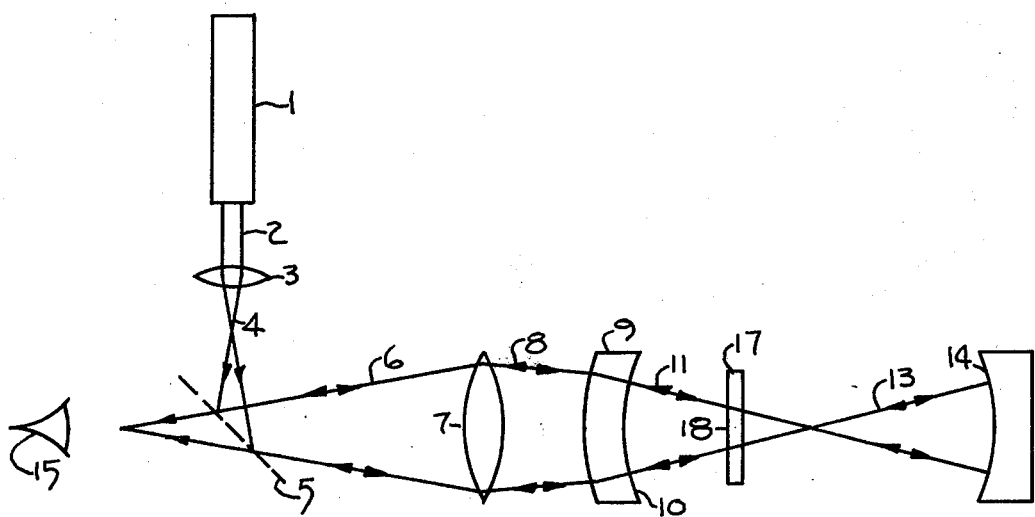
FIG. 2 is a schematic of a spherical wavefront interferometer useful for testing high reflectivity autostigmatic optical elements and systems which is the preferred embodiment of the invention.

FIG. 2 is a schematic of a spherical wavefront interferometer useful for testing high reflectivity autostigmatic optical elements and systems which is the preferred embodiment of the invention.

Referring to FIG. 2, the significant differences from the interferometer of FIG. 1 are (a) the use of the thin, partially transmissive element 17 in lieu of the field lens, (b) the reference surface 10 has a fixed reflectivity of about 4% and (c) two beam interference is produced. The element 17 is coated with a partially transmissive coating 18. The transmission factor T, of the coating 18 is determined from the relation $$R_{rs} = T^2 R_{ta} (1rs)^2, \text{ or} \quad (1)$$

$$T = \left[ \frac{R_{rs}}{R_{ta}(1 - R_{rs})^2} \right]^{1/2} \quad (2)$$

where $R_{rs}$ is the reflectivity of the reference surface 10 and $R_{ta}$ is the reflectivity of the test article surface 14. Thusly, only two beam interference results at 15.

Element 17 should be thin and of high optical quality so that it does not introduce significant errors. A commercially available plastic pellicle with a common metallic or dielectric coating is ideally suited for this element. The thickness of element 17 is determined from the spherical aberration introduced by a parallel plate in a convergent beam; typically, such elements are of the order of 0.0005 inch thick. If the speed of the spherical wavefront 11 becomes slower, the thickness of element 17 can be correspondingly increased.

Element 17 is tilted slightly so that any reflections from its surfaces do not produce spurious fringe patterns.

Because the contrast of two beam interference fringes is less critically dependent on the intensity match of the two interfering wavefronts, a pellicle with a given transmission factor suffices for a very broad range of test article reflectivities. In fact, with a fused silica reference surface a pellicle with a transmission factor of about 34% will cover the range of test article reflectivities from about 11% to 100%. Better contrast is obtained using two pellicles with transmission factors of about 52% and about 27% to cover the ranges of test article reflectivities from about 7% to about 27% and from about 27% to 100% respectively. Obviously, the tolerance on the transmission factor need not be tight.

Where a convex test article is to be measured, it is placed between the coated pellicle 17 and its common center of curvature with a reference surface 10.

The specific embodiments of the invention disclosed herein can of course be changed without departing from the invention, which is defined in the claims.

What is claimed is:

1. In a spherical wavefront interferometer for testing a highly reflective autostigmatic test article consisting of (1) a source of light (2) means for passing said light, as an expanded beam, through (3) a partially transmissive, partially reflective spherical reference surface to produce a reflected reference wavefront, and a transmitted converging spherical test wavefront which is directed toward (4) the common center of curvature of said reference surface and said highly reflective autostigmatic test article, and said test wavefront then probes (5) said test article and is reflected therefrom back through said reference surface and (6) means for interfering both said reflected reference wavefront and said reflected test wavefront, the improvement which consists in placing, between said reference surface and said test article a partially transmissive, thin coated pellicle which has a transmission factor T which approximates $$T = \left[ \frac{R_{rs}}{R_{ta}(1-R_{rs})^2} \right]^{1/2}$$

where $R_{rs}$ is the reflectivity of the reference surface, and $R_{ta}$ is the reflectivity of the test article.

2. The device of claim 1, in which the said source of light is a gas laser.

3. The device of claim 1, in which said reference surface is uncoated optical glass or fused silica, with a reflectivity of 3.5%, and the transmission factor of said pellicle is 34%, and said test article range in reflectivity is from 11% to 100%.

4. The device of claim 1, in which said reference surface is uncoated fused silica with a reflectivity of 3.5%, and the transmission factor of said pellicle is 52%, and said test article range in reflectivity is from 7% to 27%.

5. The device of claim 1, in which said reference surface is uncoated fused silica with a reflectivity of 3.5%, and the transmission factor of said pellicle is 27%, and said test article range in reflectivity is from 27% to 100%.

6. The device of claim 1, in which said test article has a convex test surface and is placed between said pellicle and said common center of curvature.

7. The device of claim 1, in which said test article has a concave test surface and is placed on the opposite side of said common center of curvature from said reference surface.

* * * * *